Patented Mar. 17, 1931

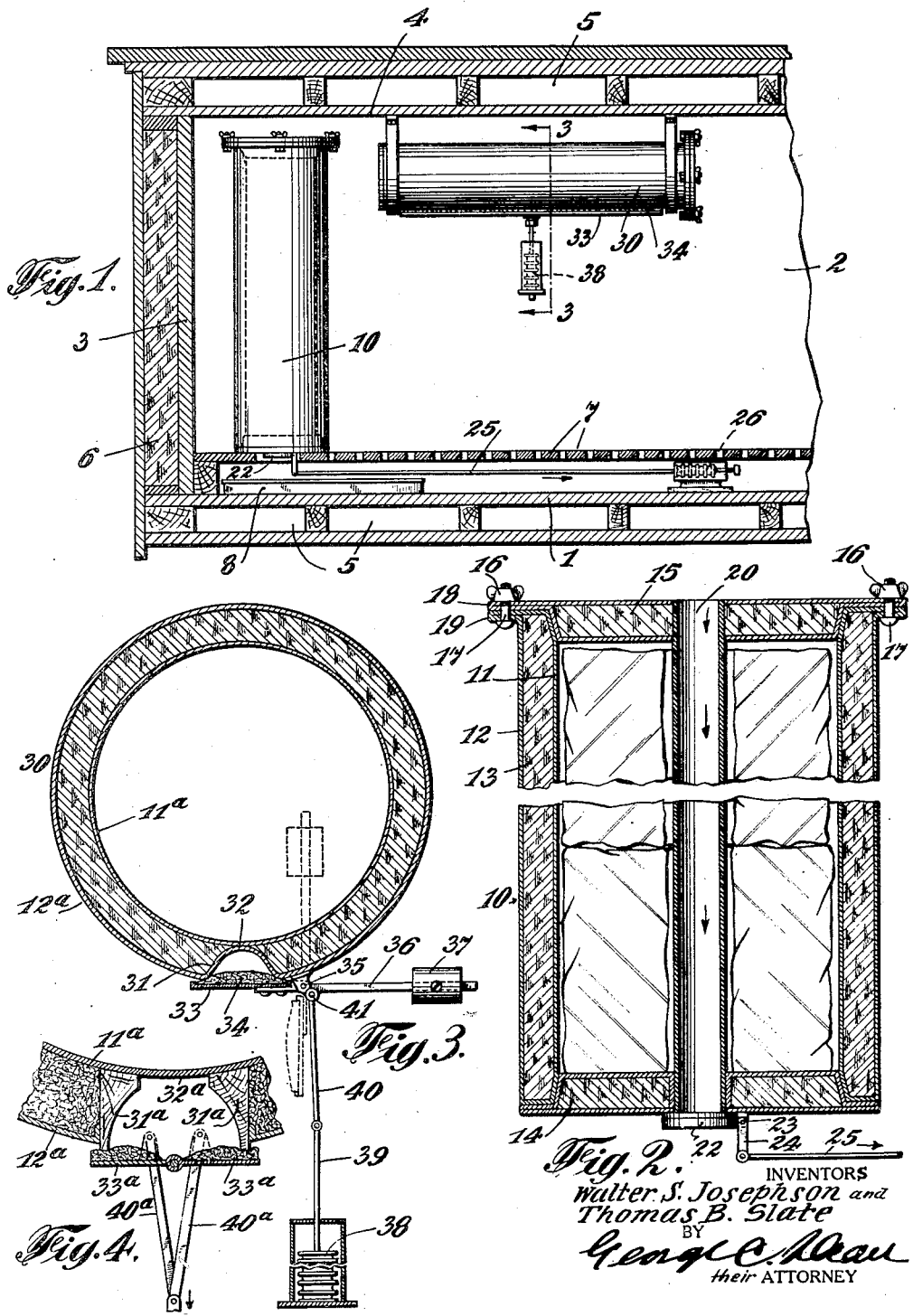

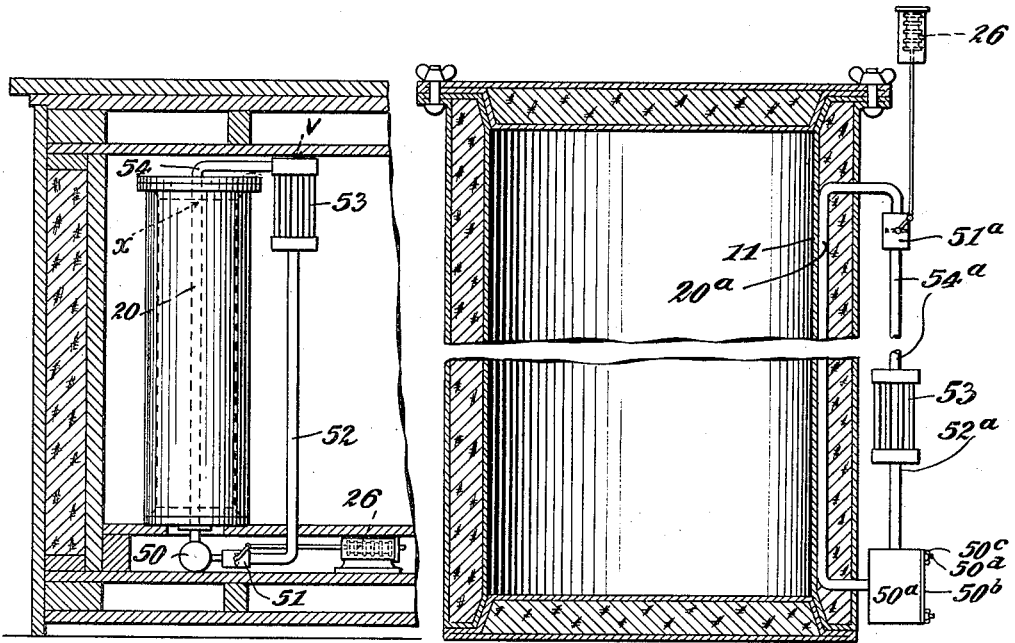
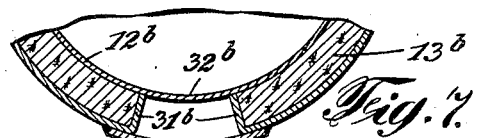
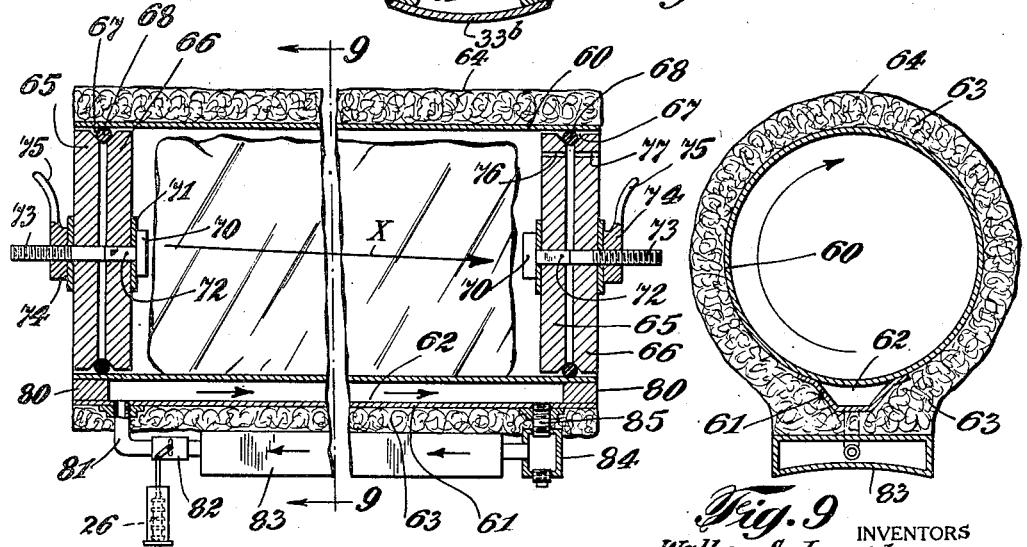

1,796,907

UNITED STATES PATENT OFFICE

WALTER S. JOSEPHSON, OF BROOKLYN, NEW YORK, AND THOMAS B. SLATE, OF GLENDALE, CALIFORNIA; SAID JOSEPHSON ASSIGNOR, BY MESNE ASSIGNMENTS, OF HIS RIGHT TO DRYICE EQUIPMENT CORPORATION, A CORPORATION OF DELAWARE; SAID SLATE ASSIGNOR OF HIS RIGHT TO AMERICAN PATENTS DEVELOPMENT CORPORATION, OF NEW YORK, N. Y., A CORPORATION OF DELAWARE

REFRIGERATING APPARATUS AND METHOD

Application filed September 10, 1924, Serial No. 736,954. Renewed January 27, 1931.

Our present invention is shown in connection with an apparatus primarily designed for controlling refrigeration temperatures where solidified carbon dioxide, in snow or compressed form, is used as the refrigerant to absorb latent heat on sublimating to gaseous form and to yield the gas as further refrigerant of extremely low temperature, in the neighborhood of 100 degrees to 140 degrees below the freezing point of water; and our said apparatus is further primarily designed for use where the temperature to be maintained by such double acting refrigerating media, is very much higher than the temperature of said refrigerants (solid carbon dioxide and the gas therefrom), preferably slightly above the freezing point of water; and particularly in connections where it is quite as important to keep the temperature slightly above freezing, as it is to keep it down to or near freezing.

It will be evident, however, that various features of our invention will be useful in specifically different relations, as for instance, in the case of frozen mixtures or compounds resembling pure solid carbon dioxide, as concerns displaying a great difference or drop between the temperature of the refrigerant medium and the temperature desired for the materials or regions to be refrigerated thereby, and functioning by a primary refrigerating effect due to absorption of latent heat upon change of the refrigerant into gaseous form and a further refrigerating effect due to the low temperature of the gaseous product; also where the purpose is to closely maintain any desired low temperature. For instance, in the transportation of frozen meats, it may be desirable to regulate the apparatus for maintaining a temperature below the freezing point of water, but not too much below, because maintaining a temperature any lower than is necessary for the purpose in view is usually wasteful, because it creates an unnecessary temperature differential between the refrigerated material or region and its exterior environment.

One object of our invention is to provide means for varying or adjusting the rate of sublimation of the solidified carbon dioxide to increase or decrease the amount and rate at which heat will be absorbed as latent heat, and the gaseous refrigerant will be given off. For this purpose, we provide adjustable means for predetermining or for varying the heat absorbing capacity of the vessel which contains the refrigerant, preferably by varying the heat insulation of the container. In certain cases this is accomplished with the least possible circulation of the air or other gases in the refrigerated space and in other cases by means calculated to promote such circulation.

Another object is to effect the variation by uncomplicated fool proof means preferably capable of being operated by a thermostat, preferably of the bellows type.

One form of our invention contemplates arranging the exposed heat absorbing surfaces horizontally and downwardly directed so that frost from the exterior air cannot collect on said surfaces over enough of the area and to sufficient thickness to afford complete insulation for said surfaces such as will occur on surfaces that are upwardly or laterally directed. In the case of the downwardly directed surfaces the air naturally approaches the surface laterally and upwardly so that most of the moisture is frozen out and deposited, much of it on lateral surfaces down which the air flows before it reaches the downward surface and much more of it at the edges of the downwardly directed surface so that by the time the air reaches central areas of the downwardly directed surfaces, the moisture more or less is frozen out of it. However that may be, the frost is of extremely delicate formation and easily detaches itself from a downwardly directed surface before it accumulates to any great extent.

Another form contemplates circulating the warming medium in a closed circuit so that a non-freezing medium may be employed as the heat carrier; or, if moist air is used, the small amount of moisture in it may frost the heat-absorbing surfaces somewhat, but the small amount of frost thus formed on the heat-absorbing surfaces will not amount to much, and the air once dried in this way will function indefinitely as a dry heat carrying medium.

Another form embodies a method whereby the normal heat absorbing capacity or rate of the containers for the carbon dioxide in snow or other solidified forms can be predetermined with reference to the space to be refrigerated, so that the refrigeration will be self regulating for constant temperature, the variations of external temperature against which the refrigeration is to be maintained, being taken care of by various factors such as location of the container, together with the external water condensation, frosting, melting and evaporation due to the moisture contained in the air or gas filling the refrigerated space. It will be understood that our present invention may be employed as a supplement to and in combination with such automatic self regulating features or it may be employed as a substitute therefor. That is to say, the container may be made normally as near self regulating as possible, or it may be insulated as completely as possible and regulated solely by and in accordance with our present invention.

The above and other features of our invention may be more fully understood from the following description in connection with the accompanying drawings, in which Fig. 1 is a vertical section through a portion of a refrigerator here shown as a car with our refrigerating devices shown in side elevation;

Fig. 2 is a vertical section through one of the refrigerator units;

Fig. 3 is a transverse section through the other refrigerator unit on the line 3—3, Fig. 1;

Fig. 4 is a section corresponding to Fig. 3, but showing a modification;

Fig. 5 is a view like Fig. 1, but showing a modification;

Fig. 6 is a view like Fig. 2, but showing a modification;

Fig. 7 is a view like Fig. 3, but showing a modification;

Figs. 8 and 9 are vertical sections respectively longitudinal and transverse, showing still another modification.

In Fig. 1 the refrigerator car is indicated as being of conventional construction, having a floor 1, side wall 2, end wall 3 and ceiling 4 of the usual double wall and interspace construction affording heat insulation, either by dead air space as indicated at 5, 5, or by cork, balsa wood or similar filling as indicated at 6. For purposes of our invention we prefer to provide the car with a slat floor 7, somewhat elevated above the usual floor 1. One purpose of this is to provide a ventilation space beneath the cargo into which the colder and therefore heavier portions of the air and gas may sink and circulate beneath all parts of the cargo, until diffused, warmed and displaced upward by fresh supplies of cold gas flowing down from the refrigerating devices. The space below the floor may be kept moist and may be supplied with large shallow pans of water as indicated at 8.

In a refrigerator of the above or any other desired type, we arrange the containers for the refrigerant. The vertical container 10 may be a heat insulated receptacle of any desired construction, preferably extending nearly to the top of the car. As shown, the body portion comprises an inner shell 11, outer shell 12 and cork or other heat-insulating filler 13. The bottom 14 and top 15 may be of similar construction. The inner and outer shells may be of sheet metal, the bottom being secured by strip welding or in any other desired way and the top being removably secured by wing nuts 16 on bolts 17 passing through the flanges 18, 19, but either or both shells may be of nonconducting material or even of waterproof fabric or fibreboard, if desired. Extending through this container is a tube 20 of good conducting material, such as aluminum or other metal, affording an air draft passage here shown as extending downward through the top and out at the bottom of the container.

The metal tube 20 is preferably entirely without exterior or interior insulation so that it operates effectively to conduct heat from the air to the refrigerant when the warm down-draft flows through the tube.

It will be evident that with such construction and with the tube 20 open at both ends, the rate of sublimating of the solid carbon dioxide within the container, will be determined mainly by the heat derived from the air flowing through said tube and conducted by the walls of the latter into direct heat exchange relation with said solid, because the rate of heat absorption through the well-insulated outer walls of the container will be small by comparison.

Control of heat absorption through the bare metal walls of the tube may be attained in a very simple manner by arranging a valve 22 preferably at one end of the tube, preferably the lower end. This valve is conveniently indicated in the drawing as a flap valve pivoted on shaft 23 and operated through a crank arm 24 on the end of said shaft, by a rod 25 which is reciprocated by thermostatic means conventionally indicated at 26 as being a metal bellows tube. Normally the valve 22 is closed and the air or gas trapped in the tube 20 is cooled to a very low temperature through the intensely refrigerated walls of said tube 20, and being correspondingly heavy, it remains trapped and thus substantially prevents inflow of warm air from the top of the car into the upper end of the tube. When the bellows warms above the critical temperature for which it is designed or adjusted, it pulls on the rod 25, thereby rotating shaft 23 and swinging the valve 22 downward. This permits the heavy cold air to flow out of the tube, thus sucking warm air into the upper end thereof. This warm air imparts heat to the inner surface of the tube, which heat is conducted or radiated to the solid carbon dioxide. The primary effect is to chill the air which becoming cold becomes heavy and creates a down current through tube 20 which is continuously maintained so long as the valve 22 is open. The secondary effect is to cause the solid to sublimate to gaseous form, the gas being, as before explained, a low temperature refrigerating medium which escapes through the joints of the cover or a special vent therefor may be provided if desired. The cold air flowing out of the bottom of tube 20 and the still heavier and colder gaseous sublimate from the solid both flowing downward and diffusing through the refrigerated space in the car ultimately chill the thermostatic bellows 26, causing contraction thereof and pushing on rod 25 and closing valve 22.

The above form of the device is better adapted for use where there is but little moisture in the air and gas atmosphere within the car because if such moisture is present, the tube 20 and also the valve may be impeded or even rendered inoperative by collection of frost and ice condensing from the air as it flows downward through the tube. This difficulty is minimized or wholly obviated by control means such as shown in connection with the horizontal container 30. This container is also well insulated over most of its surface and also has a portion of great heat absorbing capacity, but said latter portion is in the form of an outwardly opening recess or groove, preferably extending along the lowermost portion of the container. As shown in Fig. 3, the exterior shell is bent inward as at 31, preferably the full depth of the insulation and into contact with the inner shell 11a. As the melting solid carbon dioxide rests directly on this portion of the shell 11a, the crown of the groove at 32 is in intimate heat exchange relation to said solid, and is thereby maintained at very low temperature. This area of great heat transferring capacity is normally rendered inaccessible to the exterior air by a valve-like closing strip 33 provided with a felt face 34. Strip 33 may be of balsa wood or other non-conducting material. It is fixed on an arm 36 carrying an adjustable counterbalance weight 37 and is moved about its pivot shaft 35 by thermostatic bellows 38, which may be a bellows tube as previously described. The bellows operates through rod 39, link 40 and crank pivot 41, which is pivotally connected to the valve mounting, at one side of its fixed pivotal point 35.

When the thermostat 38 is expanded by heating beyond the critical temperature for which it is designed or adjusted, it operates to swing the insulating closure 33 outward, preferably to the fully open position shown in dotted lines. Preferably the counterweight 37 and arm 36 are arranged at one end of the pivot shaft 35 so as to permit swinging to this outward position. When the valve opens, the relatively cold air which has been trapped in the closed cavity of the groove 31, sinks, and the relatively warmer and lighter air and gas from the exterior flow inward into the groove and give up their heat to the container until becoming heavy by chilling they sink and are in turn replaced by warmer air. A continuous convection current is thus established which operates to continuously supply heat at 32 which is directly conducted to the inner shell 11a and to the solid resting thereon. As before explained, the crown portion 32 of the groove 31 is maintained at such low temperature by the adjacent solid carbon dioxide and is so located with reference to thermoconvection currents, that it does not collect frost sufficient to afford substantial insulation. This is because air approaching the region of the groove naturally flows down along the laterally directed surface of the container and must approach the groove laterally and then upwardly. Consequently, most of the moisture is frozen out on the adjacent surfaces and on the lower portions of the downwardly exposed groove surfaces. Consequently, the crown of the groove, and for a substantial distance on either side of the crown, little or no frost will be deposited or, if it does, it is of delicate formation and easily becomes detached and falls by its own weight, into or without ordinary physical movements or vibration either of the container or of the valve.

It is desirable to have the groove 31, and particularly the crown 32, of metal so far as concerns the function of rapid heat transfer when the valve member 33 is open, but in some cases it may be found that when the valve member 33 is closed, the heat transfer function remains objectionably active. An arrangement obviating this difficulty is shown in Fig. 4, wherein the groove walls are indicated as being formed by blocks or strips of insulating material 31a, 31a, preferably of balsa wood. These strips are spaced apart so as to expose a strip of the bare metal shell, as at 32a, which serves for direct transfer of heat from the convection currents when the valve is open, but conduction through the balsa wood strips when the valve is closed is too slow to be objectionable. In this figure we have shown a pair of central oppositely hinged cover strips or valves 33a, 33a, somewhat similar to the single strip 33 of Fig. 3, but centrally hinged and opening downward back to back. The thermostat (not shown) operates through the links 40a, 40a. However, said grooves may be used without valves, thus becoming the dominant factor in determining the heat absorption rate for the container. That is to say, the other surfaces of the container may be so well insulated that heat absorption is determined mainly by the area of exposed surface of the inner shell at the crown of the groove. Obviously there may be similar omission of the valve 22 for the tube 20 of Figs. 1 and 2, and with like result.

The arrangements shown in Figs. 6, 7, 8 and 9 also have advantages over the central tube arrangement, a very practical form being shown in Fig. 7, where, instead of making the tube central, the outer shell is turned in as at 31b to provide a retaining wall for the insulating filler 13b; a substantial area of the inner shell 12b is exposed as at 32b; and the groove is closed in by permanently secured cover plate 33b. This cover plate may be of metal or of balsa wood, and may be secured in any desired way.

In connection with the preceding control devices we have explained the liability to impairment of the functioning of the device by reason of frost and ice which may accumulate by condensation from the moist air and gas draft that is used as the heat applying medium. This may be avoided and other advantages secured after the manner shown in Fig. 5. Here the construction is substantially identical with that shown in Figs. 1 and 2, except that the lower end of tube 20 is connected to its upper end for closed circuit circulation of the air or other fluid media, the down flow of which in tube 20 is controlled by the thermostat. In said Fig. 5 the connection is diagrammatically indicated as through a down-pipe and enlarged chamber or trap 50, valve 51, up-pipe 52, radiator 53 and cross-pipe 54. The colder heavier air in the pipe 20 tends to flow downward and the somewhat warmer air in pipe 52 tends to flow upward. The radiator 53 may be an ordinary automobile or truck radiator, here used as a circulation heater, absorbing heat from the adjacent atmosphere and thereby refrigerating it, instead of vice versa. Normally circulation is substantially blocked by the valve 51 so long as the latter is closed, but as soon as the valve is opened by the thermostat 26, the circulation is initiated. The cold air falls in pipe 20 and the warmer air from the radiator warms the tube 20, melting a proportionate amount of the solid carbon dioxide, yielding the intensely cold gaseous refrigerant which escapes from the container into the refrigerated space until the latter is cooled sufficiently to cause thermostat 26 to close valve 51.

As shown in Fig. 6, the down-draft pipe 20a may be arranged in the walls of the container in contact with the inner shell 11. The trap 50a may be of larger size and provided with a removable cover 50b secured by wing nuts 50c on stud bolts 50d. The valve chamber 51a may be located in the up-pipe 52a, and the thermostat 26 may be located in the region of flux of the warmer variable-depth, layer of air and gas atmosphere that is formed within a foot or so of the roof of the car. The radiator 53 may be much lower down than in Fig. 5 and the maximum heating effect on the air circulation being at a lower level, will leave a much greater vertical column 54a in which the warmer, lighter air may exercise maximum effect in producing a greater pressure differential between the up-pipe and the down-pipe, thereby causing more rapid circulation.

In the closed-circuit circulation illustrated in Figs. 5 and 6, it is evident that all frosting effects resulting from moisture inside the pipe circuit, may be entirely prevented by using dry gas or air in the circulation, for instance, a small amount of lime may be placed in trap 50a to absorb the initial moisture that may be in the air, or if desired, dry carbon dioxide gas may be used, as for instance by placing a piece of the solid carbon dioxide in trap 50a and allowing it to melt and drive off the air through a perforation which may be drilled in the top of pipe 54a to permit escape of the air, the hole being afterwards plugged.

A similar arrangement adapted for use in connection with a horizontally arranged container is shown in Figs. 8 and 9. Here the container consists of a cylinder 60, preferably of thin sheet iron having secured along the bottom thereof a trough-shaped member 61, affording a passage 62 for flow of the air or other heating medium in intimate heat exchange relation with the wall of container 60. The whole may be heat insulated as by a covering 63 of hair felt held in place by a suitable binder and covered with canvas or waterproof fabric 64. The ends of the cylinder 60 may be removably closed, sealed and heat insulated by two similar closures, each consisting of a pair of discs 65, 66, preferably of balsa wood, each about 2 inches thick and chamfered as at 67 to afford recesses for an annular rubber packing 68, which is adapted to be squeezed or wedged radially into intimate contact with the cylinder 60, by screwing together the discs 65, 66, by means of a central bolt having a head 70 engaging washer 71 and having a shank squared as at 72, closely fitting a squared recess in the disc 65. The threaded portion 73 projects through the disc 66 and is provided with a nut 74, provided with a handle 75 which may be rotated to force the discs towards each other for the purpose described above. The container being hermetically sealed by these closures, we prefer to arrange small perforations 76, 77, extending through the discs 65, 66, near the uppermost edges thereof. These perforations are preferably large enough to vent the interior and prevent substantial pressure therein, but have their lengths and flow resistance duly proportioned and designed with respect to normal output of refrigerant gas, so that in operation the flow will always be from the interior to the exterior, thereby avoiding inbreathing of moist air from the outside. Otherwise, in-breathing moisture would freeze within the container, materially increasing the heat insulation of the solid carbon dioxide therein and in certain cases freezing up the vent sufficiently to cause irregularity of action, besides possible accumulation of dangerous internal pressures.

The interspace between the discs 65, 66, is an added safeguard, since even if moisture does diffuse through the outer perforation 77, it will be frozen and trapped in the interspace instead of inside the container.

Thermostatic control for closed-circuit heating of a horizontal container of the above or any other desired type may be afforded through the above described passage 62, which is closed at the ends by plugs 80, 80, preferably of balsa wood. One end of the conduit 62 is connected with the other end through pipe 81, valve chamber 82, radiator 83 and trap 84 and pipe 85. In this case the exterior radiating surface 83, Fig. 9, is concaved upwardly so that the moist air can approach it only from below. This will minimize frost formation.

Circulation through conduit 62 and radiator 83 may be accelerated by a slight endwise inclination of the container or of the radiator or of the whole structure, as indicated by the inclination of the arrow $x$, Fig. 8; and the whole structure may be axially rotated 180° as indicated by the circular arrow, Fig. 9. This would bring the radiator on top, close to the roof, in the warmest part of the car where the temperature may be a substantial amount above freezing even when the air a foot or two lower is within one degree of freezing. In such case, as also in the case of the high-up radiator 53, Fig. 5, the frost on the radiator will have an opportunity to melt off, when the thermostatic control cuts off circulation for long periods, as is likely to occur in actual practice of the invention.

In various respects, the showings of the closed circuit circulation in Figs. 5, 6 and 8 are diagrammatic, and it will be understood that the location and extent of the exterior circuit and the number, size and location of the radiators may be varied within wide limits and where the heat insulation of the containers is sufficiently perfect practically the entire refrigerating effect derived from absorption of latent heat in sublimating the solid carbon dioxide may be distributed through the radiators, while the gaseous refrigerating product of the sublimation is permitted to escape directly into the refrigerated chamber. In certain cases the latter product may also be discharged into the radiator system, as indicated at $x$ Fig. 5, the surplus gas accumulating in the system being vented, as indicated at $v$, after substantial warming by such circulation.

The thermostatically controlled valves are above described as "normally" closed, but it will be understood that their opening and closing depends upon the actual temperature within the car and this is determined by the rate at which the car absorbs heat from the outside, as compared with the rate of refrigeration (heat absorption) afforded by the sublimating solid and the refrigerant gas flowing therefrom. Hence so far as concerns the broader features of the invention, it is entirely possible to design the apparatus or to vary the conditions of its use, so that some or all of the valves will be open longer than they are closed. For instance, in the case of a car loaded in a very hot climate and proceeding to a very cold climate, the balance may be such that some or all of the thermostats would hold their valves open most of the time during the first part of the trip, and closed most of the time or all of the time during the last part of the trip.

In so far as any subject matter disclosed herein is the same as that disclosed in the sole application of Slate, Ser. No. 740,162, filed September 27, 1924, it is to be understood that our present joint invention is subsequent, and is for features patentable over those covered by said Slate application.

We claim:

1. Means enclosing space to be refrigerated and means for refrigerating it, including a heat insulated container, said container enclosing a supply of solidified carbon dioxide adapted to sublimate upon absorption of heat, thereby yielding a low temperature refrigerant gas, said container embodying also a heat conducting element upon which said solidified carbon dioxide normally rests, and means whereby a downwardly exposed portion of the under surface of said conducting element is accessible only by upflow of the air or gas within the refrigerated space.

2. A refrigerator and means therein for refrigerating it, including a heat insulated container having a gas outlet discharging within the refrigerator, said container enclosing a supply of solidified carbon dioxide adapted to sublimate upon absorption of latent heat, thereby yielding a low temperature refrigerant gas escaping through said outlet, the bottom of said container being of metal and adapted to have its under-surface exposed downwardly through a recess opening downwardly through the heat insulation.

3. A method of refrigeration which includes protecting a supply of solidified carbon dioxide by gas sublimated therefrom and by insulating material of dimensions and quality predetermined to effect refrigeration within a desired range, under normal conditions while applying excess gas escaping therefrom as a refrigerant for the refrigerated space; sublimating a part of said solidified carbon dioxide to supply such gas by heat conducted from the atmosphere of said space through said insulation under normal conditions; and controllably supplementing said supply of gas under emergency conditions by variably supplying additional heat from said atmosphere to said primary refrigerant in accordance with the temperature of the refrigerated space.

4. A method of refrigeration which includes protecting a supply of solidified carbon dioxide by insulating materials of dimensions and quality predetermined to effect refrigeration within a desired range, under normal conditions while permitting refrigerant gas therefrom to escape into the atmosphere to be refrigerated; sublimating a part of said solidified carbon dioxide to supply such gas by heat conducted from said atmosphere through said insulation under normal conditions; automatically exposing said primary refrigerant to a greater inflow of heat from the refrigerated space when the temperature of said refrigerated space arises above a desired temperature.

5. A method of refrigeration which includes protecting a supply of solidified carbon dioxide by insulating materials of dimensions and quality predetermined to effect refrigeration within a desired range under normal conditions while utilizing gas therefrom as insulation about said solid; sublimating a part of said solidified carbon dioxide to supply such gas by heat conducted from said atmosphere through said insulation; and supplying additional heat to said solid carbon dioxide through a good conductor in heat exchange relation between said atmosphere and said refrigerant.

6. A method of refrigeration which includes protecting a supply of solidified carbon dioxide by insulating materials of dimensions and quality predetermined to effect refrigeration within a desired range under normal conditions while utilizing the sublimated gas to insulate said solid; sublimating a part of said solidified carbon dioxide to supply such gas by heat conducted from said atmosphere through said insulation under normal conditions; and controllably supplementing said supply of gas under emergency conditions by variably supplying additional heat to said solid refrigerant by establishing and thermostatically controlling convection currents of said atmosphere in direct heat exchange relation with said solid refrigerant.

7. A method of refrigerating a space by means of solid carbon dioxide, which includes heat-insulating a supply of the solid carbon dioxide sufficiently to effect refrigeration of said space within a desired range under normal conditions while also utilizing the sublimated gas as an insulating medium for said solid; sublimating a part of said solid by and in accordance with heat conducted from said space to said solid under normal conditions; and controllably varying the sublimating rate under emergency conditions by automatically exposing said solid to a greater inflow of heat from the refrigerated space when the temperature of said refrigerated space tends to rise above a desired temperature.

8. A method of refrigerating a space by means of solid carbon dioxide, which includes heat-insulating a supply of the solid carbon dioxide sufficiently to effect refrigeration of said space within a desired range under normal conditions while also utilizing the sublimated gas as an insulating or refrigerant medium for said space; sublimating a part of said solid by and in accordance with heat conducted from said space to said solid under normal conditions; and controllably varying the sublimating rate under emergency conditions by variably supplying more or less heat from the refrigerated space to said solid, according as the temperature of the refrigerated space exceeds or falls below the designed normal range.

9. A refrigerator having therein a container for solid carbon dioxide and means designed and operating to afford insulation predetermined with reference to the refrigerator so as to effect refrigeration within a desired range under normal conditions; means for automatically exposing said solid refrigerant to a greater inflow of heat from the refrigerated space when the temperature of said refrigerated space tends to rise above a desired temperature.

10. A refrigerator having therein a container for solid carbon dioxide and means designed and operating to afford insulation predetermined with reference to the refrigerator so as to effect refrigeration within a desired, relatively high temperature range, under normal conditions; and means for variably applying additional heat from the refrigerated space to said solid carbon dioxide to controllably supplement said supply of gas under emergency conditions, by and in accordance with the temperature of the refrigerated space.

11. A refrigerator and means therein for refrigerating it, including a heat insulated container having a suitable gas outlet, said container enclosing a supply of solidified carbon dioxide adapted to sublimate upon absorption of heat, thereby yielding low temperature heat insulating gas, in combination with a conduit extending in heat exchange relation with said container and connections for closed circuit flow of a fluid medium serially through said conduit and through an external circuit including a large area heat absorbing element in heat exchange relation with the atmosphere within the refrigerator, whereby convection-circulation may be automatically maintained.

12. A refrigerator and means therein for refrigerating it, including a container enclosing a supply of solidified carbon dioxide adapted to sublimate upon absorption of heat, and maintaining said solid in a bath of the gas escaping therefrom, in combination with a conduit extending in heat exchange relation with said container and connections for closed circuit flow of a heat transfer medium serially through said conduit and through an external circuit including a large area heat absorbing element in heat exchange relation with the atmosphere within the refrigerator, whereby convection-circulation may be automatically maintained, together with means for controlling flow of said convection currents in said circuit by and in accordance with the temperature of said atmosphere in the refrigerator.

13. A chamber to be refrigerated and a container having walls adapted to absorb heat derived from the refrigerated space, solid carbon dioxide inside the container, and a conduit including a metal element having a surface in heat exchange relation with gas sublimated from said solid and arranged for through flow of atmosphere from the refrigerated space.

14. A chamber to be refrigerated and a container having metal walls adapted to absorb heat derived from the refrigerated space, solid carbon dioxide inside the container, and a metal conduit arranged for through flow from a high level to a low level of the atmosphere of said chamber and extending in heat transfer relation to said solid.

15. A chamber to be refrigerated and a container for solid carbon dioxide which is gastight except for high level outlet for escape of gas therefrom, said container having an exterior metal surface adapted to absorb heat from atmosphere of the refrigerated space and metal interior surfaces in heat imparting relation to solid carbon dioxide and gas evaporating therefrom within the container.

16. An insulated chamber enclosing a container for solid carbon dioxide which is gastight except for high level outlet for escape of gas therefrom, said container having an exterior surface adapted to absorb heat from atmosphere of the refrigerated space and metal interior surfaces in heat imparting relation to solid carbon dioxide and gas evaporating therefrom within the container, in combination with a metal tube accessible for inflow of air from the upper part of said insulated chamber and having an intermediate portion in heat imparting relation to the gas evaporated from said solid, within said container.

17. In a device of the class described, the combination of an insulated container, solid carbon dioxide inside the container, a metal tube extending downward through the container, a valve adapted to control opening and closing of the lower end of the tube to put same into or out of communication with the surrounding or outer atmosphere, and a thermostat operatively connected with said valve.

18. In a device of the class described, the combination of an insulated container, solid carbon dioxide inside the container, a metal conduit extending downward through the container, a valve adapted to control opening and closing said conduit to put same into or out of communication with the surrounding or outer atmosphere, and a thermostat operatively connected with said valve.

19. A refrigerator, a horizontally elongated heat insulating container in the upper part thereof, enclosing frozen carbon-dioxide and provided with an outlet for escape of sublimated carbon dioxide gas, in combination with controlling means for variably applying heat to said frozen carbon dioxide to vary the outflow of said gas through said outlet, said means including a valve actuated by a thermostatic motor located in the upper part of the refrigerated space in the region of flux of the relatively-warm, variable, depth layer of atmosphere near said upper wall or roof of said car.

20. A chamber to be refrigerated and a container having walls heat insulated but adapted to absorb heat derived from the refrigerated space, solid carbon dioxide inside the container, and a conduit including a metal element having a surface in heat transfer relation to the contents of said container and arranged for through flow of atmosphere from the refrigerated space.

21. A chamber to be refrigerated and a container having walls adapted to absorb heat derived from the refrigerated space, solid carbon dioxide inside the container, and a metal conduit arranged for through flow from a higher level to a lower level of the atmosphere of said chamber and extending in heat transfer relation to said solid.

22. A chamber to be refrigerated and means for refrigerating it, including a container enclosing a supply of solidified carbon dioxide adapted to sublimate upon absorption of heat, thereby yielding low temperature heat insulating gas, in combination with a conduit extending in heat exchange relation with said container and connections for closed circuit flow of a fluid medium serially through said conduit and through an external circuit including one or more large area heat absorbing elements exposed to the atmosphere within said chamber, whereby convection-circulation may be automatically maintained.

23. A chamber to be refrigerated and means for refrigerating it, including a container enclosing a supply of solidified carbon dioxide adapted to sublimate upon absorption of heat, thereby yielding low temperature refrigerant gas, in combination with a conduit and connections for closed circuit flow of said gas from said solid serially through said conduit and through an external circuit including large area heat absorbing elements exposed to the atmosphere within said chamber, and means for escape of excess gas from said circuit.

24. A chamber to be refrigerated and means for refrigerating it, including a container enclosing a supply of solidified carbon dioxide adapted to sublimate upon absorption of heat, thereby yielding low temperature refrigerant gas, in combination with gastight means through which said gas from said solid flows serially through one or more large area heat absorbing elements exposed to the atmosphere within said chamber and through a high level outlet designed and arranged to permit escape of the warmed excess gas while retaining a substantial body of the cooler gas, thereby opposing tendency to reverse flow from the atmosphere into which said outlet discharges.

25. A method which includes enclosing solid carbon dioxide in a gas tight container, gasifying the solid by heat while permitting escape of excess carbon dioxide gas thereby expelling air or other gases, through a high level outlet; and then closing said outlet.

26. A chamber to be refrigerated and a container for solid carbon dioxide which is gas tight except for a high level outlet for escape of gas therefrom, said container including a metal element and said solid being in close heat exchange relation with one portion of said metal; another portion of said metal extending outwardly from said container and exposed for absorption of heat from a more distant portion of the atmosphere to be refrigerated.

27. A method, which includes enclosing solid carbon dioxide in a metal container in close heat transfer relation with a portion of said metal and collecting heat from the refrigerating space by conduction through metal elements extending outward into close heat exchange relation with the atmosphere in said space.

28. A refrigerator and a container therein enclosing solid carbon dioxide, such container being gas tight but adapted to permit escape of gas from a high level thereof, the exterior surfaces and the interior surfaces of such container being of metal.

29. A refrigerator and a container therein enclosing solid carbon dioxide, such container being gas tight but adapted to permit escape of gas from a high level thereof, the exterior of said container being of metal enclosing and protecting heat insulating material.

Signed by WALTER S. JOSEPHSON, at Montreal, Province of Quebec, Dominion of Canada, this 26th day of August, A. D. 1924, and by THOMAS B. SLATE, at New York City, in the county of New York and State of New York, this 19th day of August, A. D. 1924.

WALTER S. JOSEPHSON.
THOMAS B. SLATE.